Nov. 22, 1960 W. P. WILSON 2,961,307
METHOD OF LEACHING ORES
Filed July 15, 1957
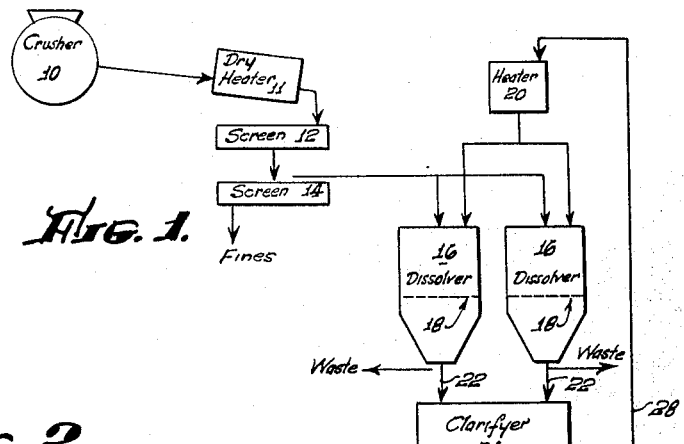
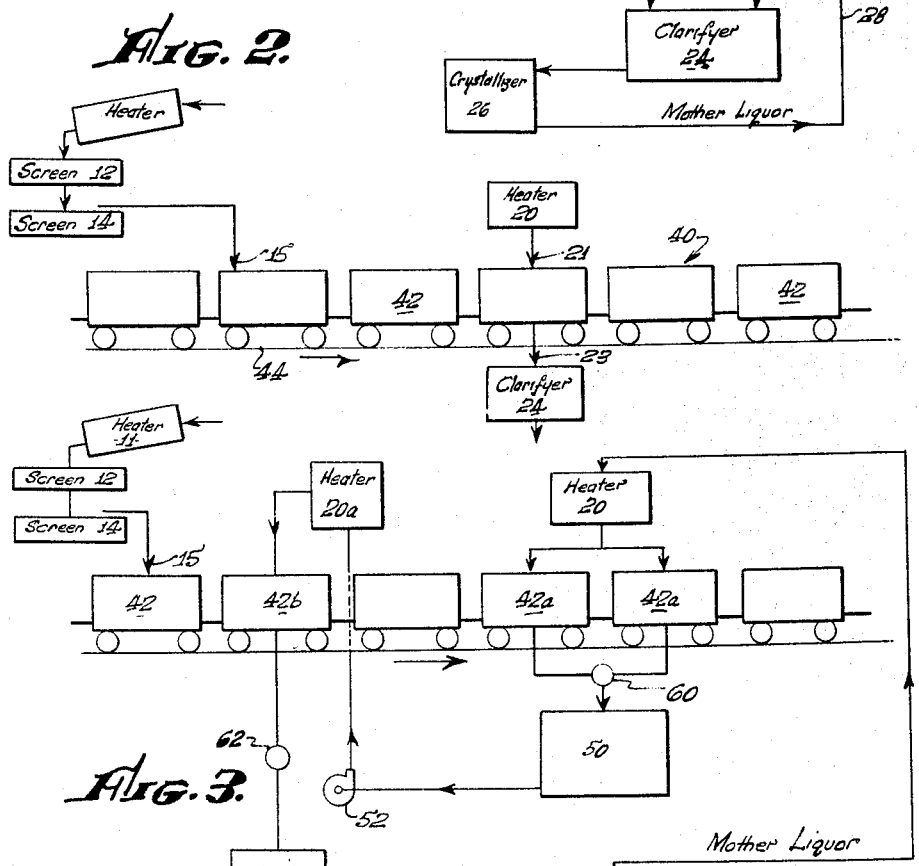
WILLIAM PAGE WILSON,
INVENTOR
By Barkalow + Lewis United States Patent Office 2,961,307
Patented Nov. 22, 1960

2,961,307

METHOD OF LEACHING ORES

William Page Wilson, Carlsbad, N. Mex., assignor to United States Borax & Chemical Corporation, Los Angeles, Calif., a corporation of Nevada Filed July 15, 1957, Ser. No. 671,765

4 Claims. (Cl. 23—309)

This invention has to do with processes for the extraction, by dissolution, of values contained in ores which also contain clays or similar slime producing materials.

A typical instance of such ores are the sylvinite ores such as occur at Carlsbad, New Mexico. Those ores contain potassium chloride, sodium chloride, some minor minerals, and slime-forming clays in amounts up to as much as five percent. In previous liquid methods of extracting the potash values, separation of the clay slimes from the liquid is expensive both in time and equipment; and that is so, for example, in dissolution processes where the crushed ore is subjected to leaching with a liquid saturated with respect to sodium chloride. The clays tend very largely to be carried off as slimes in the resulting solution and must be removed by such operations as filtering or settling before crystallizing out the potash and before re-running the mother liquor.

In a typical dissolution process, the crushed ores are leached in a dissolver at a relatively high temperature, say 200° F., with a mother liquor saturated with the sodium chloride at that temperature. The resulting solution is substantially saturated with potassium chloride and carries large amounts of clay slime, particularly if the ore has a large clay content. It is then necessary to remove those slimes, usually done by settling and/or filtering. The potash values are then crystallized out by lowering the solution temperature, and the cooled mother liquor is re-heated for repeated leaching.

Many efforts have been made to increase the efficiency and reduce the cost of clay separation, or to decrease the slime-forming tendency of the clays. Such efforts, as far as known, have been either practically ineffectual or have involved added cost in processing. For instance, it has been proposed to preliminarily roast the ores to decrease their sliming tendency, which operation necessarily involves the expenditure of heat.

I have discovered an extremely simple and relatively inexpensive leaching method that wholly, or very largely, eliminates the slime problem in beneficiating such ores as sylvinite. My new method is characterized by leaching the ores by downward flow in a deep static undisturbed bed (in contradistinction to the usual agitated or dispersive leaching), the leaching bed being composed exclusively of ore bodies within a certain definite size range. As will appear, when leaching is performed under those conditions, most of the clay slime is held in the leaching bed and only a small amount is carried off in the solution to be separated out. My new method will be best understood from the following description of an illustrative procedure, illustrated in the accompanying drawing in which:

Fig. 1 is a schematic flow sheet;
Fig. 2 is a schematic showing of a modification; and
Fig. 3 is a schematic showing of another modification.

In my method as typically herein illustrated, the ore is first crushed, as in a crusher 10, to suitable size, and is then heated in heater 11 (referred to below) and then screened at screen 12 of a mesh size discussed below. The crushed ore passing that screen is then screened at screen 14, of smaller mesh, as discussed below. The initial crushing is performed in such manner that as great a fraction as practicable passes screen 12 and is held on screen 14 and is carried off from 14 to the dissolvers 16. The small fraction of fines passing screen 14 is treated separately.

The major portion of the ore, in sizes restricted to those between the mesh sizes of screens 12 and 14, is delivered to the dissolvers (two or more) in sequence to form relatively deep beds 18 therein. One dissolver being bedded, the hot mother liquor, substantially saturated with NaCl at that temperature, is directed from heater 20 to that dissolver to pass down through the bed in such manner and rate as not to disturb the bed. It is essential to the success of my method that the liquid flow be downward through the bed and that the bed be deep and substantially undisturbed. When these conditions are observed, with the bed composed of sizes within the range discussed below, the bed acts as a filter bed to hold the sliming clay bodies and particles.

The solution passing off at 22 may go to clarifying equipment 24 to remove the small amount of clay carried by the liquid. From that operation the clear solution then goes to a crystallizer or crystallizers indicated at 26 where the temperature is lowered to crystallize out the KCl. The mother liquor is then passed back, at 28, to heater 20 and the reheated liquor is then passed to the dissolver that at the time is in action.

It will be understood that my leaching operation preferably, or necessarily, involves batch operation in order to maintain an undisturbed bed. Thus, one dissolver may first be bedded with the ore. Then, while that bed is being leached, the ore flow from the screens may be delivered to another dissolver to prepare its bed for leaching operation. While that leaching operation is going on the waste is cleaned out of the first dissolver and its or another bed prepared.

The limitations I have discovered, necessary for the practical operation of my method, are now set out. In general, the optimum size range is made up of the sizes passing a two mesh, or preferable a three or four mesh screen, per inch, and held on a screen of approximately twenty to twenty-eight mesh (Tyler screen sizes). The following table gives comparative results of leaching a quiet bed of ore four feet deep and carrying about five percent clay with a liquor substantially saturated with sodium chloride heated to 200° F.

| Screen size, Tyler | Flow rate, gal./min./sq. ft. | Percent Loss Potash | Percent Clay in Solution |
|---|---|---|---|
| −4, +10 | 8.7 | 20.5 | 0.61 |
| −4, +20 | 4.0 | 15.2 | 0.22 |
| −4, +35 | 0.4 | 65.6 | 0.01 |
| −4 | drip | 100.0 | none |

The flow rates given in the second column are the rates per square foot of sectional area, at which the liquid passed down through the four foot bed under a standing head of liquid above the bed of about 6 inches. As will be noted, the flow rate decreases as the size of the fines retained in the bed is decreased. The percentage of undissolved potash, in uniform runs of about 60 minutes, is given in the third column. The fourth column gives the percentage of clay, in terms of the original amount in the ore, that is carried off in the solution. That percentage decreases as the flow rate decreases. The optimum performance is at about the conditions of the second row in the table where the flow rate is relatively large, the potash loss is minimum and the clay carried in the solution is relatively small. Less retention of fines in the bed (the first row) results in larger potash loss and a very large proportion of the clay in the solution. Materially greater retention of the fines than that given in the second row decreases the flow rate and markedly increases the potash loss.

Additionally I have discovered that further improvement in flow rate and decrease in the potash loss is obtained by pre-heating the ore, as at heater 11, with dry heat to about the temperature of the leaching solution. Heating wet, as with steam, results in no substantial difference from the results given in the second row of the table, apparently because of clay release by bed disturbance and the moisture. However, with the bed specifications given in that second row, and pre-heating dry to 240° F., the flow rate is increased to 5.1 gallons per minute per square foot, and the potash loss reduced to 13.8%, the clay in the leached solution being increased, but only slightly, to 0.24%.

I have found that an initial bed depth of about four feet produces the optimum results. That initial depth can be somewhat less, but should not be less than about three feet. The bed compacts during leaching, the four foot bed compacting to about three feet. A shallower bed somewhat increases the flow rate but decreases the potash recovery and increases the percentage of clay in the solution. The bed may be initially deeper than three or four feet; there is no upper limit except convenience in operation.

The minor amount of fines that pass screen 14 may be given any suitable treatment to extract their potash values. For example they may be processed by flotation, or they may be roasted and then be leached in any suitable manner, for instance in a dispersion type of leaching equipment.

Fig. 2 illustrates a variation in the equipment that may be employed. In this modification, the system operation is continuous, although the ore is still leached in quiet beds in batches. Here, the selected ore sizes from between screens 12 and 14 is continuously delivered, as at the point 15, to a continuously moving conveyor 40, here illustrated as a series of containers such as open topped cars 42 moving along a track 44. As the cars pass under point 15 they successively receive their beds of the ore. Then, as they pass under a point such as 21 they receive the leaching liquor and the resulting solution then flows, at 23, to the element 24 where the solution is clarified of its carried clays. The remainder of the system may be the same as in Fig. 1.

A further improvement in the method is illustrated in Fig. 3, where the ore beds are leached in two steps. This two-step leaching can be applied to the apparatus schematically shown in Fig. 1; but is here shown, illustratively, as applied to the continuous system of Fig. 2.

Fig. 3 shows again, as an illustration of a continuous conveyer, a string of open topped cars 42 moving in the direction indicated. At 15 the cars successively receive their beds of ore from the screens. At such a position as 42a, the bed or beds in one or more cars receive the heated mother liquor from heater 20. The resulting solution goes to a tank 50, whence it is moved, as by pump 52, to a heater 20a for reheating to again be at about the temperature of 200° F. From that heater, the solution then goes to the bed in a car at a position such as 42b; and from there the final solution goes to the clarifier and crystallizes as before.

In this system, the fresh bed of ore at 42b is first leached with the solution coming from the second leaching of a bed or beds at 42a with the fresh mother liquor. Each bed, undisturbed, is leached twice, first with a solution partially saturated with the potash to produce the final solution saturated to the desired concentration. Then that same bed, without disturbance during or between the two leachings, is leached a second time with the fresh mother liquor, to produce the partially saturated potash solution that goes to the first leaching operation.

Suitable controls are used in this type of operation to maintain each of the two solutions at the desired concentrations. The controls may, for example, depend on specific gravities. Thus, for a typical sylvinite ore, the desired specific gravity at the point 60 may be, say 1.240, and a control at that point may control the flow of liquor through the bed or beds at 40a. And the desired specific gravity of the final solution at the point 62 may be, say, 1.250; and a control at that point may control the flow through the bed at 42b.

Due to settlement and compacting of the ore beds during leaching, the flow rate per square foot decreases. Thus in the first leaching at 42b the average flow rate may be, say, eight gallons per minute per square foot; and that at the second leaching at 42a, four gallons per minute per square foot. Thus, to keep the total flow rates the same at each leaching, so that the system may be continuous, twice the cross-sectional area is leached at the second leaching. That is illustrated here by showing one bed being leached in the first stage at 42b, and two being simultaneously leached in the second stage at 42a.

I claim:

1. The method of recovering potassium salts from sylvinite ores containing slime-forming clay, which comprises in combination the steps of crushing said ore, screening and removing a cut from said crushed ore having a particle size in the range of from about 2 mesh to about 28 mesh, forming a relatively deep leaching bed of said selected cut of ore, passing a solvent liquid having a temperature of about 200° F. downwardly through said bed to leach the potassium salts therefrom said liquid substantially saturated with NaCl at said temperature, maintaining a standing head of said liquid above the bed and maintaining the bed substantially undisturbed.

2. The method of claim 1 which includes dry-heating the ore used to make said leaching bed to a temperature in the range from about 200° F. to about 240° F. before treatment with the solvent liquid.

3. The method of recovering potassium salts from sylvinite ores containing slime-forming clay which comprises in combination the steps of crushing said ore, screening and removing a cut from said crushed ore having a particle size in the range from about 2 mesh to about 28 mesh, dry-heating said cut of ore to a temperature in the range from about 200° F. to about 240° F. and forming a relatively deep leaching bed, leaching said bed a first time with a solvent liquid having a temperature of about 200° F., said liquid substantially saturated with NaCl at said temperature, said liquid passing downwardly through said bed, leaching the bed a second time while maintaining a standing head of liquid above the bed during the successive leachings, and maintaining the bed substantially undisturbed during and intermediate said leachings.

4. The method of claim 3, wherein the first leaching is performed with a solvent liquid partially saturated with potassium salts, and the second leaching is performed with a solvent liquid substantially free of potassium salts.

References Cited in the file of this patent

UNITED STATES PATENTS

| | | |
|---|---|---|
| 2,008,667 | Keyes | July 30, 1935 |
| 2,569,672 | Jackson | Oct. 2, 1951 |
| 2,733,809 | Wrege et al. | Feb. 7, 1956 |
| 2,788,257 | Duke | Apr. 9, 1957 |